United States Patent [19]
Ona et al.

[11] Patent Number: 4,935,464
[45] Date of Patent: Jun. 19, 1990

[54] ORGANOPOLYSILOXANE MICROEMULSION, PROCESS FOR ITS PRODUCTION AND APPLICATION THEREOF

[75] Inventors: Isao Ona; Masaru Ozaki, both of Chiba, Japan

[73] Assignee: Toray Silicone Company Limited, Tokyo, Japan

[21] Appl. No.: 187,610

[22] Filed: Apr. 28, 1988

[30] Foreign Application Priority Data

Apr. 30, 1987 [JP] Japan ................. 62-107580

[51] Int. Cl.$^5$ .................. C08L 83/08; C08L 83/06
[52] U.S. Cl. ...................... 524/837; 524/838
[58] Field of Search ................. 524/837, 838

[56] References Cited

U.S. PATENT DOCUMENTS

| | | | |
|---|---|---|---|
| 3,975,294 | 8/1976 | Dumoulin | 252/354 |
| 4,228,054 | 10/1980 | Ona et al. | 260/29.2 M |
| 4,476,282 | 10/1984 | Koerner | 524/837 |
| 4,620,878 | 11/1986 | Gee | 106/287.15 |
| 4,696,969 | 9/1987 | Thimineur | 524/837 |

Primary Examiner—C. Warren Ivy
Attorney, Agent, or Firm—George A. Grindahl

[57] ABSTRACT

A microemulsion with an average particle size not exceeding 0.15 micrometers or organopolysiloxane composed of trifunctional siloxane units with the formula $RSiO_{3/2}$ and difunctional siloxane units with the formula $R^1_2SiO$ is characterized by transparency, by excellent mechanical, dilution, and blending stabilities and by an excellent stability against pH variations. The microemulsion is prepared by process comprising the slow addition, to an aqueous emulsion-polymerization catalyst solution, of a crude emulsion prepared from an organotrialkoxysilane having the formula $RSi(OR^1)_3$, a cyclic organopolysiloxane having the formula $(R^1_2SiO)_n$, a surfactant, and water. A microemulsion which consists of 30 to 95 mol % trifunctional siloxane units and 70 to 5 mol % difunctional siloxane units is useful as a fiber-treatment agent that can impart slip resistance to fibrous material without stiffening the hand, while at the same time not causing oil spots.

9 Claims, No Drawings

ORGANOPOLYSILOXANE MICROEMULSION, PROCESS FOR ITS PRODUCTION AND APPLICATION THEREOF

BACKGROUND OF THE INVENTION

The present invention relates to an organopolysiloxane microemulsion, a process for its production, and a fiber-treatment composition based on said organopolysiloxane microemulsion. More specifically, the present invention relates to a microemulsion of organopolysiloxane having difunctional and trifunctional organosiloxane units, to a process for the production of such a microemulsion, and to a fiber-treatment composition which is based on said microemulsion.

With regard to emulsions of organopolysiloxane having difunctional and trifunctional organosiloxane units (below, referred to as di/tri organopolysiloxane), Japanese Patent Application Laid Open Number 54-131661 (131,661/79) describes such emulsions obtained by the emulsion polymerization of cyclic organosiloxane and functional group-containing organotrialkoxysilane.

Furthermore, fabrics made from natural fiber such as cotton, flax, silk, wool, angora and mohair; regenerated fiber such as rayon and bemberg; semisynthetic fiber such as acetate; or synthetic fiber such as polyester, polyamide, polyacrylonitrile, polyvinyl chloride, vinylon, polyethylene, polypropylene, spandex, and, among the long-fiber weaves in particular, taffeta, twill, Georgette, gauze, etc., with their especially coarse textures, readily undergo slip due to yarn separation. As a consequence, thermosetting resins such as epoxy, melamine, glyoxal, etc.; thermoplastic resins such as acrylic, etc.; latexes such as natural rubber, styrene/butadiene, etc.; and colloidal silica, among others, have been used as slip inhibitors.

However, the emulsions of di/tri organopolysiloxane known in the art consist of organopolysiloxane emulsions having average particle sizes of at least 0.3 microns, and accordingly, the stability (mechanical stability) with respect to the processes necessarily encountered in fiber treatment (agitation, circulation, expression of the treatment bath, etc.), the stability (dilution stability) against dilution (for example, 20-fold to 100-fold dilution with water). and the stability (blending stability) with regard to use with additives are all unsatisfactory. As a consequence, such an emulsion undergoes de-emulsification, and the organopolysiloxane floats to the top of the treatment bath. It will then appear as oil drops (oil spots) on the fibrous material, thus generating the serious problem of "staining."

Furthermore, because the stability (mechanical stability) with respect to the processes necessarily encountered in release agent applications (agitation, circulation, etc.), the stability (dilution stability) against dilution (for example, 20-fold to 100-fold dilution with water), and the stability (blending stability) with regard to use with additives are all unsatisfactory, such emulsions undergo de-emulsification and the organopolysiloxane separates. This adheres to the surface of the molding, creating the serious problem of oil spots.

When fiber is treated with a thermosetting resin (e.g., epoxy, melamine, glyoxal, etc.), thermoplastic resin (e.g., acrylic, etc.), or a latex (e.g., styrene/butadiene, natural rubber, etc.) in order to equip fibrous material with slip resistance, slip resistance is in fact obtained, but the hand becomes particularly stiff. Furthermore, the use of colloidal silica suffers from the problem of sedimentation of the colloidal silica unless this particular process is carried out at low temperatures for short periods of time with strict management of the pH of the treatment bath.

BRIEF SUMMARY OF THE INVENTION

The present invention, having as its object a solution to the aforementioned problems, provides a di/tri organopolysiloxane microemulsion which has excellent mechanical, dilution, blending, and pH stabilities; a fiber-treatment composition which imparts slip resistance without causing the fibrous material to have a stiff hand, which does not cause oil spots, and which has an excellent mechanical, dilution, blending, and pH stabilities; and a process for the production of such a microemulsion.

This object, and others which will occur to one upon considering the following disclosure and appended claims, is realized by the process of the present invention for preparing an organopolysiloxane microemulsion having a particle size not exceeding 0.15 micrometers which consists of emulsion polymerization, by the gradual addition to an aqueous emulsion-polymerization catalyst solution, of a crude emulsion prepared from 10 to 95 mol% organotrialkoxysilane having the formula $RSi(OR^1)_3$, from 90 to 5 mol% as $R^1_2SiO$ units of cyclic organopolysiloxane having the formula $(R^1_2SiO)_n$, a surfactant and water.

Because the present invention's organopolysiloxane microemulsion has an average particle size not exceeding 0.15 micrometers it is characterized by transparency, by excellent mechanical, dilution, and blending stabilities and by an excellent stability against pH variations. These properties allow it to be used to prepare a fiber-treatment composition having excellent mechanical, dilution, and blending stabilities, and stability against pH changes that can impart slip resistance to fibrous material without stiffening the hand, while at the same time not causing oil spots.

DETAILED DESCRIPTION OF THE INVENTION

The aforesaid objects are accomplished by a microemulsion composition comprising an organopolysiloxane having an average particle size not exceeding 0.15 micrometers and composed of 10 to 95 mol% trifunctional siloxane units with the formula $RSiO_{3/2}$ wherein R is a monovalent organic group and 90 to 5 mol% difunctional siloxane units with the formula $R^1_2 SiO$ wherein $R^1$ is a monovalent hydrocarbon or halogenated hydrocarbon group.

To explain the preceding, the present invention's organopolysiloxane microemulsion is a microemulsion of an organopolysiloxane composed of 10 to 95 mol% trifunctional siloxane units with the formula $RSiO_{3/2}$ and 90 to 5 mol% difunctional siloxane units with the formula $R^1_2SiO$, and it has an average particle size not exceeding 0.15 micrometers.

R in the above formula is a monovalent organic group, and is exemplified by alkyl groups such as methyl, ethyl, propyl, and butyl; substituted alkyl groups such as 2-phenylethyl and 2-phenylpropyl; 3,3,3-trifluoropropyl; alkenyl groups such as vinyl and propenyl; aryl and substituted aryl groups such as phenyl and tolyl; and organofunctional groups such as gamma-aminopropyl, gamma-(N-ethylamino)propyl, gamma-(N-butylamino)propyl, 4-(N-cyclohexylamino)butyl, 4-(N-phenylamino)butyl, N- aminoethylaminopropyl, beta-(N,N-dimethylamino)ethyl, gamma-glycidoxypropyl, 3,4-epoxycyclohexylpropyl, gamma-mercaptopropyl, and gamma-methacryloxypropyl. The R groups in the organopolysiloxane may be identical or different.

$R^1$ in the above formula is a monovalent hydrocarbon or halogenated hydrocarbon group, and is exemplified by alkyl groups such as methyl, ethyl, propyl, and butyl; substituted alkyl groups such as 2-phenylethyl and 2-phenylpropyl; 3,3,3-trifluoropropyl; alkenyl groups such as vinyl and propenyl; and aryl and substituted aryl groups such as phenyl and tolyl. The groups $R^1$ in the organopolysiloxane may be identical or different.

With regard to the constituent proportions of the siloxane units, 10 to 95 mol% trifunctional siloxane units and 90 to 5 mol% difunctional siloxane units are required. Preferred values are 20 to 90 mol% trifunctional siloxane units and 80 to 10 mol% difunctional siloxane units. In the case of less than 10 mol% trifunctional siloxane units, the organopolysiloxane will not afford a durable rubber or resin coating after removal of the water fraction. On the other hand, the microemulsion will not be stable when 95 mol% trifunctional siloxane units is exceeded.

The average particle size in the emulsion must not exceed 0.15 micrometers, and preferably does not exceed 0.12 micrometers. When this average particle size exceeds 0.15 micrometers, the organopolysiloxane will separate due to the reduced mechanical, dilution, and blending stabilities, and oil spots will then appear on the treated material.

Furthermore, unless the object of the invention is adversely affected, the organopolysiloxane in the instant microemulsion may contain small quantities, not to exceed 10 mol%, of units expressed by $SiO_2$ and/or units expressed by $R_3SiO_{1/2}$.

The organopolysiloxane microemulsion of the present can be prepared by the process of this invention for the production of a microemulsion composition comprising an organopolysiloxane having an average particle size not exceeding 0.15 micrometers and composed of 10 to 95 mol% trifunctional siloxane units with the formula $RSiO_{3/2}$ wherein R is a monovalent organic group and 90 to 5 mol% difunctional siloxane units with the formula $R^1_2SiO$ wherein $R^1$ is a monovalent hydrocarbon or halogenated hydrocarbon group, said process comprising gradually adding to an aqueous emulsion-polymerization catalyst solution a crude emulsion composed of (A) 10 to 95 mol% organotrialkoxysilane having the formula $RSi(OR^1)_3$ wherein R is a monovalent organic group and $R^1$ is a monovalent hydrocarbon or halogenated hydrocarbon group, (B) 90 to 5 mol% as $R^1_2SiO$ units of cyclic organopolysiloxane having the formula $(R^1_2SiO)_n$ wherein $R^1$ is a monovalent hydrocarbon or halogenated hydrocarbon group and n is an integer having a value of 3 to 10, (C) surfactant, and (D) water and maintaining the resulting mixture at 0 to 90° C. until the desired emulsion polymerization has been achieved.

The organotrialkoxysilane $RSi(OR^1)_3$ comprising component (A) is one starting material for the microemulsion of the present invention, and is the essential component for providing a network organopolysiloxane. R in the above formula is a monovalent organic group, and is exemplified as above. $R^1$ is a monovalent hydrocarbon or halogenated hydrocarbon group, again exemplified as above. This component may consist of one species or two or more species.

Concrete examples of this component are methyltrimethoxysilane, ethyltrimethoxysilane, propyltriethoxysilane, butyltrimethoxysilane, vinyltrimethoxysilane, phenyltrimethoxysilane, beta-aminoethyltrimethoxysilane, beta-aminoethyltriethoxysilane, beta-aminoethyltriisopropoxysilane, gamma-aminopropyltriethoxysilane, gamma-aminopropyltri-n-propoxysilane, gamma-aminopropyltri-n-butoxysilane, 4-aminocyclohexyltriethoxysilane, 4-aminophenyltriethoxysilane, N-aminoethyl-gamma-aminopropyltrimethoxysilane, N-aminoethyl-gamma-aminopropyltricyclohexylsilane, beta-glycidoxyethyltrimethoxysilane, beta-glycidoxyethyltriethoxysilane, gamma-glycidoxypropyltrimethoxysilane, gamma-glycidoxypropyltriethoxysilane, beta-(3 4-epoxycyclohexyl)ethyltrimethoxysilane, gamma-mercaptopropyltrimethoxysilane, gamma-mercaptopropyltriethoxysilane, gamma-methacryloxypropyltrimethoxysilane, and gamma-methacryloxypropyltriethoxysilane.

The cyclic organopolysiloxane $(R^1_2SiO)_n$ comprising component (B) is, like component (A). a starting material for the present invention's microemulsion. $R^1$ in the formula is a monovalent hydrocarbon or halogenated hydrocarbon group, and is exemplified as above. n is an integer having a value of 3 to 10. This component may consist of the single species or of two or more species. The groups $R^1$ in the single molecule may be the same or may differ.

The use ratio between components (A) and (B) is to be a value which provides 90 to 5 mol% as $R^1_2SiO$ units of component (B) against 10 to 95 mol% component (A). It is preferably a value providing 80 to 10 mol% as $R^1_2SiO$ of component (B) against 20 to 90 mol% component (A).

The siloxane unit molar ratio in the organopolysiloxane after emulsion polymerization can be freely adjusted by means of the molar ratio between component (A) and component (B) in the crude emulsion.

Furthermore, as long as the object of the present invention is not adversely affected, small quantities, affording no more than 10 mol% as siloxane units, of hexaalkyldisiloxane, tetraalkoxysilane, etc., may be added.

The surfactant comprising component (C) is the essential component for converting components (A) and (B) into the crude emulsion. Surfactants operative in the present invention are the anionic, cationic, and nonionic surfactants.

Examples of the anionic surfactants are alkylbenzenesulfonic acids such as hexylbenzenesulfonic acid, octylbenzenesulfonic acid, decylbenzenesulfonic acid, dodecylbenzenesulfonic acid, cetylbenzenesulfonic acid, and myristylbenzenesulfonic acid; the sulfate esters of polyoxyethylene monoalkyl ethers such as $CH_3(CH_2)_6CH_2O(C_2H_4O)_2SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_8CH_2C_6H_4O(C_2H_4O)_2SO_3H$; and alkylnaphthylsulfonic acids.

Examples of the cationic surfactants are quaternary ammonium hydroxides and their salts such as octyltrimethylammonium hydroxide, dodecyltrimethylammonium hydroxide, hexadecyltrimethylammonium hydroxide, octyldimethylbenzylammonium hydroxide, decyldimethylbenzylammonium hydroxide, didodecyldimethylammonium hydroxide. dioctadecyldimethylammonium hydroxide, tallow trimethylammonium hydroxide and cocotrimethylammonium hydroxide.

Examples of nonionic surfactants are the polyoxyalkylene alkyl ethers, the polyoxyalkylene alkylphenol ethers, the polyoxyalkylene alkyl esters, the polyoxyalkylene sorbitan alkyl esters, polyethylene glycols, polypropylene glycols, and diethylene glycol.

The surfactant may be used as the single species or as the combination of two or more species, with the exception of the combination of anionic surfactant with cationic surfactant. In concrete terms, it is permissible to use a single species of anionic surfactant, or the combination of two or more species of anionic surfactants, or a single species of nonionic surfactant, or the combination of two or more species of nonionic surfactants, or a single species of cationic surfactant, or the combination of two or more species of cationic surfactants, or the combination of two or more species respectively selected from anionic and nonionic surfactants, or the combination of two or more species respectively selected from cationic and nonionic surfactants.

The surfactant comprising component (C) is used in the crude emulsion in that quantity which provides for the formation of an emulsion, and this will vary with the type of surfactant. As a consequence, this quantity of use is not specifically restricted, but is preferably about 2-50 wt% based on 100 weight parts of components (A) and (B).

The water comprising the component (D) in the crude emulsion is preferably used in a quantity which gives an organopolysiloxane concentration of about 10-60 wt%.

The crude emulsion is prepared by mixing the organotrialkoxysilane comprising component (A), the cyclic organopolysiloxane comprising component (B), the surfactant comprising component (C), and the water comprising component (D) to homogeneity, and by passing this mixture through an emulsifying device such as an homogenizer, colloid mill, or line mixer, etc.

The organopolysiloxane microemulsion of the present invention can be obtained by means of an emulsion polymerization in which the crude emulsion prepared as above is gradually added to a separately prepared aqueous emulsionpolymerization catalyst solution.

These emulsion-polymerization catalysts encompass anionic and cationic catalysts. The anionic catalysts are exemplified by mineral acids such as hydrochloric acid and sulfuric acid, and by the alkylbenzenesulfonic acids, sulfate esters of polyoxyethylene monoalkyl ethers, and alkylnaphthylsulfonic acids given as examples of the surfactant comprising component (C). The cationic catalysts are exemplified by alkali metal hydroxides such as potassium hydroxide and sodium hydroxide, and by the quaternary ammonium hydroxides and salts thereof given as examples for the surfactant comprising component (C). However, due to the low catalytic activity of the quaternary ammonium salts, they should be used in combination with an alkali metal hydroxide for activation.

Furthermore, with regard to the ionicities of the surfactant and catalyst, when an anionic surfactant is used as the component (C) in the crude emulsion, an anionic emulsion-polymerization catalyst should be used in production of the microemulsion.

When a cationic surfactant is used as the component (C) in the crude emulsion, a cationic emulsion-polymerization catalyst should be used for production of the microemulsion.

When a nonionic surfactant is used as the component (C) in the crude emulsion, an anionic or cationic emulsion-polymerization catalyst should be used for production of the microemulsion.

The quantity of use of said emulsion-polymerization catalyst will vary with the type of catalyst and so is not specifically restricted. However, when using a mineral acid or alkali metal hydroxide catalyst, this quantity is preferably 0.2 to 5.0 weight parts and more preferably 0.5 to 3.0 weight parts for each 100 weight parts of the combined quantity of organotrialkoxysilane comprising component (A) and cyclic organopolysiloxane comprising component (B). For the use of alkylbenzenesulfonic acid, sulfate ester of polyoxyethylene monoalkyl ether, alkylnaphthylsulfonic acid, or quaternary ammonium hydroxide or salt thereof, this quantity is preferably 0.5 to 50 weight parts and more preferably 1.0 to 30 weight parts for each 100 weight parts of the combined quantity of organotrialkoxysilane comprising component (A) and cyclic organopolysiloxane comprising component (B). Nonionic surfactant as exemplified for component (C) may be added at this point in order to improve the stability during emulsion polymerization.

The temperature of the aqueous catalyst solution is preferably 40° to 95° C. when the crude emulsion is gradually added thereto, such as by dripping. The rate of addition will vary with the type and concentration of the catalyst and the temperature of the aqueous catalyst solution. Addition can be rapid at high catalyst concentrations or elevated aqueous catalyst solution temperatures. However, in order to produce microemulsions having smaller particle sizes, in general it is preferred that the crude emulsion be dripped in so as to obtain both dispersion and transparency.

After the termination of addition, the present invention's organopolysiloxane microemulsion having an average particle size not exceeding 0.15 micrometers is produced by an emulsion polymerization at 0° to 90° C. until the specified viscosity is achieved. After this emulsion polymerization, it is preferred that the catalyst be neutralized, with alkali in the case of an anionic polymerization catalyst and with acid in the case of a cationic polymerization catalyst. Furthermore, while the organopolysiloxane concentration during emulsion polymerization is not specifically restricted, it is preferably 5 to 50 wt%. The present invention s organopolysiloxane microemulsion obtained as above can be used as a mold-release agent, release agent, paint additive, defoamer, lustrant, plastic coating agent, fiber-treatment agent, etc.

The fiber-treatment agent of the present invention is based on a microemulsion comprising an organopolysiloxane having an average particle size not exceeding 0.15 micrometers and composed of 30 to 95 mol% trifunctional siloxane units with the formula $RSiO_{3/2}$ wherein R is a monovalent organic group and 70 to 5 mol% difunctional siloxane units with the formula $R^1_2SiO$ wherein $R^1$ is a monovalent hydrocarbon or halogenated hydrocarbon group. Forty-five to 90 mol% trifunctional siloxane units and 55 to 10 mol% difunctional siloxane units are preferred. The slip resistance becomes unsatisfactory at below 30 mol% of said trifunctional siloxane units.

In addition, as long as the object of the invention is not compromised, the fiber-treatment agent of the present invention may as desired contain additional water; resin finishing agents such as glyoxal resin, melamine resin, urea resin, polyester resin, and acrylic resin; rubber latexes such as styrene/butadiene latex and natural rubber latex; organohydrogenpolysiloxane emulsion and organoalkoxysilane emulsion; surfactants: preservatives; colorants; the salts between organocarboxylic acids and metals such as iron, lead, antimony, cadmium, titanium, calcium, bismuth, zirconium, etc.; organic amino compounds as condensation catalysts, such as triethanolamine, triethylenediamine, dimethylphenylamine, etc.; among others.

Fibrous material is treated with the fiber-treatment agent of the present invention using such methods as spraying, roll application, brush coating, immersion, etc. The add-on will vary with the fibrous material and so is not specifically restricted, but is generally in the range of 0.01 to 10.0 wt% as organopolysiloxane fraction based on the fibrous material. The fibrous material is then treated by, for example, standing at room temperature, exposure to a hot air current, heating, etc.

With regard to substance, the fibrous material is exemplified by natural fibers such as wool, silk, flax, cotton, angora, mohair, and asbestos; by regenerated fibers such as rayon and bemberg; by semisynthetic fibers such as acetate; by synthetic fibers such as polyester, polyamide, polyacrylonitrile, polyvinyl chloride, vinylon, polyethylene, polypropylene, and spandex; and by inorganic fibers such as glass fiber, carbon fiber, and silicon carbide fiber. In its form it is exemplified by staple, filament, tow, top, and yarn, and in its structure it is exemplified by knits, weaves, and nonwovens.

The present invention will be explained in the following with reference to illustrative examples, in which parts = weight parts and %=wt% unless otherwise specified and the viscosity is the value at 25° C. Me denotes the methyl group.

EXAMPLE 1

Water, 158.5 parts. 1.5 parts hexadecyltrimethylammonium chloride, 150.0 parts methyltrimethoxysilane, and 15.0 parts cyclic dimethylsiloxane tetramer were placed in a 500 mL beaker and mixed to homogeneity using a propeller stirrer. This mixture was then passed once through an homogenizer at a pressure of 300 kg/cm$^2$ to afford a crude emulsion. Water, 152.7 parts, 10 parts hexadecyltrimethylammonium chloride, and 0.8 parts sodium hydroxide were separately placed in a 500 mL four-neck flask equipped with a stirrer reflux condenser addition funnel, and thermometer. After dissolution, the liquid was maintained at 85° C. with slow stirring. The previously prepared crude emulsion was then gradually dripped into the aqueous catalyst solution over 90 minutes. After addition, emulsion polymerization was carried out by stirring for an additional 30 minutes at 85° C. After polymerization and cooling, 1.2 parts acetic acid was added to adjust the pH to 7, thus to afford a microemulsion of organopolysiloxane composed of 84.4 mol% CH$_3$SiO$_{3/2}$ units and 15.6 mol% (CH$_3$)$_2$SiO units (Microemulsion A). The average particle size in this microemulsion was measured using a Quasi-Elastic Light Scattering Model M2000 (Malrer. USA). and a value of 0.05 micrometers was obtained. The external appearance was slightly white and transparent, and the transmittance at 580 nanometers was 67%. A 10 mL portion of this microemulsion was collected, and a nonvolatile fraction of 22.0% was measured at 105° C. In addition, 25 mL of this microemulsion was placed in a centrifuge tube and spun at 2,500 rpm for 30 minutes. There was no separation of the microemulsion. The microemulsion was also maintained at 25° C. for 6 months and was found to be stable, with no change occurring. Finally, the microemulsion's 50-fold dilution with water was maintained at 25° C. for 10 hours. This emulsion was stable, undergoing no change.

EXAMPLE 2

Water, 150.0 parts, 6.7 parts polyoxyethylene (45 mol) nonylphenol ether. 50.0 parts vinyltrimethoxysilane, and 15.0 parts cyclic dimethylsiloxane tetramer were placed in a 500 mL beaker and then mixed to homogeneity using a propeller stirrer. This mixture was passed through an homogenizer once at a pressure of 300 kg/cm$^2$ in order to prepare a crude emulsion. Water, 175.3 parts, and 10.0 parts dodecylbenzenesulfonic acid were placed in a 500 mL four-neck flask equipped with a stirrer, reflux condenser, addition funnel, and thermometer, followed by dissolution and maintenance at a liquid temperature of 85° C. with slow stirring. The previously prepared crude emulsion was gradually dripped into this aqueous catalyst solution over 120 minutes, followed by maintenance after addition at 85° C. for an additional 60 minutes in order to carry out emulsion polymerization. After emulsion polymerization and cooling, 5 parts triethanolamine was added to adjust the pH to 7, thus affording a microemulsion of organopolysiloxane composed of 62.5 mol% CH$_2$=CHSiO$_{3/2}$ units and 37.5 mol% (CH$_3$)$_2$SiO units. (Microemulsion B). The average particle size in this microemulsion was measured at 0.07 micrometers. It was slightly white and transparent in its external appearance, and the transmittance at 580 nanometers was 53%. A 10 mL portion of this microemulsion was collected, and a nonvolatile fraction of 23.0% was measured at 105° C. When 25 mL of the microemulsion was placed in a centrifuge tube and spun at 2,500 rpm for 30 minutes, no microemulsion separation was observed. When the microemulsion was maintained at 25° C. for 6 months, the microemulsion was stable, undergoing no change. When the microemulsion's 50-fold dilution with water was maintained at 25° C. for 10 hours, the emulsion was stable. undergoing no change.

EXAMPLE 3

Water, 158.5 parts, 10.5 parts polyoxyethylene (40 mol) nonylphenol ether, 1.5 parts hexadecyltrimethylammonium chloride, 150.0 parts gamma-glycidoxypropyltrimethoxysilane, and 15.0 parts cyclic phenylmethylsiloxane tetramer were placed in a 500 mL beaker, and were mixed to homogeneity using a propeller stirrer. This mixture was passed through an homogenizer once at a pressure of 350 kg/cm$^2$ to prepare a crude emulsion. Water, 152.7 parts, 10 parts hexadecyltrimethylammonium chloride, and 0.8 parts sodium hydroxide were placed in a 500 mL four-neck flask equipped with a stirrer, reflux condenser, addition funnel, and thermometer, followed by dissolution and maintenance at a liquid temperature of 85° C. with slow stirring. The previously prepared crude emulsion was gradually dripped into this aqueous catalyst solution over 90 minutes, followed by maintenance at 85° C. for an additional 30 minutes after addition in order to carry out emulsion polymerization. After polymerization and cooling, 1.2 parts acetic acid was added to afford a microemulsion (Microemulsion C) of an organopolysiloxane composed of 14.8 mol% C$_6$H$_5$(CH3)SiO units and 85.2 mol% units having the following formula.

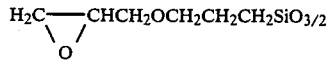

The average particle size in this microemulsion was measured at 0.07 micrometers. It was slightly white and transparent in its external appearance, and the transmittance at 580 nanometers was 68%. A 10 mL portion of this microemulsion was collected, and a nonvolatile fraction of 20.5% was measured at 105° C. When 25 mL of this microemulsion was placed in a centrifuge tube and spun at 2,500 rpm for 30 minutes no microemulsion separation was observed. When the microemulsion was maintained at 25° C. for 6 months, it was stable, without any change. When the microemulsion's 50-fold dilution with water was maintained at 25° C. for 10 hours, the emulsion was stable undergoing no change.

EXAMPLE 4

Water, 78.5 parts. 4.0 parts polyoxyethylene (40 mol) nonylphenol ether, 30.0 parts methyltrimethoxysilane, and 37.5 parts cyclic dimethylsiloxane tetramer were placed in a 500 mL beaker, and were then mixed to homogeneity using a propeller stirrer. This mixture was passed through an homogenizer once at a pressure of 350 kg/cm$^2$ to prepare a crude emulsion. Water, 138.9 parts, 9.0 parts hexadecyltrimethylammonium chloride, and 0.7 parts sodium hydroxide were placed in a 500 mL four-neck flask equipped with a stirrer, reflux condenser, addition funnel, and thermometer, followed by dissolution and maintenance at a liquid temperature of 85° C. with slow stirring. The previously prepared crude emulsion was gradually dripped into this aqueous catalyst solution over 100 minutes. After addition, emulsion polymerization was conducted by maintenance at 85° C. for an additional 45 minutes. After polymerization and cooling, 1.0 part acetic acid was added to adjust the pH to 7, thus affording a microemulsion of organopolysiloxane composed of 30.4 mol% $CH_3SiO_{3/2}$ units and 69.6 mol% $(CH_3)_2SiO$ units. The average particle size in this microemulsion was measured at 0.05 micrometers. It was slightly white and transparent in its external appearance, and the transmittance at 580 nanometers was 65%. A 10 mL portion of this microemulsion was collected, and a nonvolatile fraction of 22.5% was measured at 105° C. A 25 mL portion of this microemulsion was placed in a centrifuge tube and spun at 2,500 rpm for 30 minutes: no microemulsion separation was observed. When the microemulsion was maintained at 25° C. for 6 months, it was stable, without any change. When the microemulsion's 50-fold dilution with water was maintained a 25° C. for 10 hours, the emulsion was stable, undergoing no change.

EXAMPLE 5

Water, 132 parts, 27 parts polyoxyethylene (40 mol) octylphenol ether, 133 parts methyltrimethoxysilane, and 21 parts cyclic dimethylsiloxane tetramer were placed in a 500 mL beaker, and were then mixed to homogeneity using a propeller stirrer. This mixture was then passed once through an homogenizer at a pressure of 350 kg/cm$^2$ in order to prepare a crude emulsion. Sodium hydroxide, 0.3 parts, was dissolved in 664 parts water in a 1,500 mL four-neck flask equipped with a stirrer, reflux condenser, addition funnel, and thermometer, and this was then maintained at a liquid temperature of 85° C. with slow stirring. The previously prepared crude emulsion was gradually dripped into this aqueous catalyst solution over 100 minutes. After addition, emulsion polymerization was conducted by maintenance at 85° C. for an additional 45 minutes. After polymerization and cooling, the pH was adjusted to 7 by adding 1.0 part acetic acid, thus to afford a microemulsion of organopolysiloxane composed of 75 mol% $CH_3SiO_{3/2}$ units and 25 mol% $(CH_3)_2SiO$ units. The average particle size in this microemulsion was measured at 0.08 micrometers. It was slightly white and transparent in its external appearance, and the transmittance at 580 nanometers was 63%. A 10 mL portion of this microemulsion was collected, and a nonvolatile fraction of 15.3% was measured at 105° C. A 25 mL portion of this microemulsion was placed in a centrifuge tube and spun at 2,500 rpm for 30 minutes, no microemulsion separation was observed. When the microemulsion was maintained at 25° C. for 6 months it was stable, without any change. When the microemulsion's 50-fold dilution with water was maintained at 25° C. for 10 hours, the emulsion was stable, undergoing no change.

COMPARISON EXAMPLE 1

Cyclic dimethylsiloxane tetramer, 40 parts, was added to an aqueous solution of emulsifying agent composed of 2.0 parts dodecylbenzenesulfonic acid and 55.5 parts water. After stirring to homogeneity this was passed through an homogenizer twice at a pressure of 400 kg/cm$^2$, then maintained at 90° C. for 2 hours, cooled to 25° C., and then maintained at this temperature for 4 hours in order to carry out emulsion polymerization. An emulsion-polymerized emulsion was obtained by neutralization by the addition of 2 parts 50% aqueous triethanolamine. The average particle size in this emulsion was measured at 0.4 micrometers. It was milky white in its external appearance, and the transmittance at 580 nanometers was 0%. When this emulsion was maintained at 25° C. for 6 months, the appearance of oil drops at the surface was observed to a minor degree. When this emulsion's 50-fold dilution with water was maintained at 25° C. for 10 hours, a small oil film appeared on the surface.

EXAMPLE 6

Microemulsion A as prepared in Example 1, 20.0 parts. was combined with 660.0 parts water to prepare a treatment bath having an organopolysiloxane fraction concentration of 0.5%. A prepared 40 cm ×40 cm taffeta sample (nylon filament weave, dyed only, no resin finish) was immersed in this bath for 30 seconds, removed, expressed to 100% on a mangle roll, and then dried for 10 minutes at 105° C. The slip resistance and flexural rigidity were measured as specified below, and these results are reported in Table 1.

Slip resistance

Test specimens, 2 cm ×7 cm, were taken from the woven fabric in both the warp and filling directions. Using a razor blade, 2 cm of fabric was cut off from one end of the longer dimension, leaving 2 yarns at the center. A 0.5 cm wide strip which included these residual yarns was excised for a length of 2 cm from the other end. The test specimen was then installed in an Instron tensile tester using a grip distance of 4 cm, and was pulled at 1 cm/minute. The maximum load registered in pulling the 2 yarns out by 3 cm was designated as the slip resistance (g).

Flexural rigidity

This was measured according to JIS L-1096, "General Woven Fabric Test Methods", Method C (Clark method). The flexural rigidity is expressed in millimeters.

TABLE 1

| Sample | Slip Resistance (g) | | Flexural Rigidity (mm) | |
|---|---|---|---|---|
| | Warp | Filling | Warp | Filling |
| Example 6 | 976 | 576 | 41 | 37 |
| Untreated Fabric | 832 | 520 | 42 | 37 |
| Comparison Example 2 | 251 | 146 | 43 | 39 |
| Comparison Example 3 | 619 | 411 | 41 | 37 |
| Comparison Example 4 | 933 | 616 | 55 | 46 |

COMPARISON EXAMPLE 2

An emulsion was prepared by stirring 15 parts aminomodified dimethylpolysiloxane (viscosity = 1,100 centistokes) having the following formula.

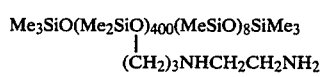

$$Me_3SiO(Me_2SiO)_{400}(MeSiO)_8SiMe_3$$
$$|$$
$$(CH_2)_3NHCH_2CH_2NH_2$$

One part emulsifying agent with the formula $C_{12}H_{25}O(C_2H_4O_6H$, 3 parts emulsifying agent with the formula $C_{12}H_{25}O(C_2H_4O)_8H$, and 81.75 parts water to homogeneity and by then adding 0.25 parts acetic acid. This was diluted 250-fold with water to prepare a treatment bath having a silicone fraction concentration of 0.5%. A 40 cm ×40 cm taffeta sample (nylon filament weave, dyed only no resin finish) was immersed in this bath for 30 seconds, removed, expressed to 100% on a mangle roll and then dried for 10 minutes at 105° C. The slip resistance and flexural rigidity were measured as specified in Example 6, and these results are reported in Table 1.

COMPARISON EXAMPLE 3

Trimethylsilyl-terminated dimethylpolysiloxane having a viscosity of 350 centistokes, 40 parts, 4.0 parts polyoxyethylene nonylphenol ether (8.5 mols EO), and 56 parts water were stirred to homogeneity. An emulsion was prepared by passing this mixture through a colloid mill. This was diluted 50-fold with water in order to prepare a treatment bath having a silicone fraction concentration of 651 0.5%. A 40 cm ×40 cm taffeta sample (nylon filament weave, dyed only, no resin finish) was immersed in this bath for 30 seconds, removed, expressed to 100% on a mangle roll, and then dried for 10 minutes at 105° C. The slip resistance and flexural rigidity were measured as specified in Example 6, and these results are reported in Table 1.

COMPARISON EXAMPLE 4

Sumitex Resin M-3 (melamine resin from Sumitomo Kagaku Kogyo Kabushiki Kaisha), used with 10% Accelerator ACX as catalyst, was diluted with water to prepare a treatment bath having a resin fraction concentration of 0.5%. A 40 cm x 40 cm taffeta sample (nylon filament weave, dyed only, no resin finish) was immersed in this bath for 30 seconds, removed, expressed to 100% on a mangle roll, and then dried for 10 minutes at 105° C. The slip resistance and flexural rigidity were measured as specified in Example 6, and these results are reported in Table 1.

EXAMPLE 7

Water, 660.0 parts, was combined with 20.0 parts Microemulsion B prepared as in Example 2 in order to prepare a treatment bath having an organopolysiloxane fraction concentration of 0.5%. A 40 cm ×40 cm taffeta sample (Tetoron finished yarn woven fabric, dyed only, no resin finish) was immersed in this bath for 30 seconds, removed, expressed with a mangle roll to 100%, and then dried at 105° C. for 10 minutes. The slip resistance and flexural rigidity were measured by the test methods of Example 6, and these results are reported in Table 2.

TABLE 2

| Sample | Slip Resistance (g) | | Flexural Rigidity (mm) | |
|---|---|---|---|---|
| | Warp | Filling | Warp | Filling |
| Example 7 | 970 | 576 | 41 | 37 |
| Untreated Fabric | 832 | 520 | 42 | 37 |
| Comparison Example 5 | 251 | 146 | 43 | 39 |
| Comparison Example 6 | 619 | 411 | 41 | 37 |
| Comparison Example 7 | 933 | 616 | 55 | 46 |

COMPARISON EXAMPLE 5

A 40 cm ×40 cm taffeta sample (Tetoron finished yarn woven fabric, dyed only, no resin finish) was immersed for 30 seconds in a treatment bath prepared as in Comparison Example 2, removed, expressed with a mangle roll to 100%, and then dried at 105° C. for 10 minutes. The slip resistance and flexural rigidity were measured by the test methods of Example 6, and these results are reported in Table 2.

COMPARISON EXAMPLE b 6

A 40 cm ×40 cm taffeta sample (Tetoron finished yarn woven fabric, dyed only, no resin finish) was immersed for 30 seconds in a treatment bath prepared as in Comparison Example 3, removed, expressed with a mangle roll to 100%, and then dried at 105° C. for 10 minutes. The slip resistance and flexural rigidity were measured by the test methods of Example 6, and these results are reported in Table 2.

COMPARISON EXAMPLE 7

A 40 cm ×40 cm taffeta sample (Tetoron finished yarn woven fabric, dyed only, no resin finish) was immersed for 30 seconds in a treatment bath prepared as in Comparison Example 4, removed, expressed with a mangle roll to 100%, and then dried at 105° C. for 10 minutes. The slip resistance and flexural rigidity were measured by the test methods of Example 6, and these results are reported in Table 2.

EXAMPLE 8

Water, 660.0 parts, was combined with 20.0 parts Microemulsion C prepared as in Example 3 in order to prepare a treatment bath having an organopolysiloxane fraction concentration of 0.5%. A 40 cm ×40 cm taffeta sample (Tetoron finished yarn woven fabric, thinner than the woven fabric used in Example 6, dyed only, no resin finish) was immersed in this bath for 30 seconds, removed, expressed with a mangle roll to 100%. and then dried at 105° C. for 10 minutes. The slip resistance and flexural rigidity were measured by the test methods of Example 6. and these results are reported in Table 3.

TABLE 3

| Sample | Slip Resistance (g) | | Flexural Rigidity (mm) | |
|---|---|---|---|---|
| | Warp | Filling | Warp | Filling |
| Example 8 | 177 | 139 | 35 | 32 |
| Untreated Fabric | 141 | 122 | 34 | 31 |
| Comparison Example 8 | 64 | 69 | 34 | 32 |
| Comparison Example 9 | 112 | 111 | 32 | 31 |
| Comparison Example 10 | 159 | 141 | 50 | 45 |

COMPARISON EXAMPLE 8

A 40 cm ×40 cm taffeta sample (Tetoron finished yarn woven fabric, thinner than the woven fabric used in Example 6, dyed only, no resin finish) was immersed for 30 seconds in a treatment bath prepared as in Comparison Example 2, removed, expressed with a mangle roll to 100%, and then dried at 105° C. for 10 minutes. The slip resistance and flexural rigidity were measured by the test methods of Example 6, and these results are reported in Table 3.

COMPARISON EXAMPLE 9

A 40 cm ×40 cm taffeta sample (Tetoron finished yarn woven fabric, thinner than the woven fabric used in Example 6, dyed only, no resin finish) was immersed for 30 seconds in a treatment bath prepared as in Comparison Example 3, removed, expressed with a mangle roll to 100%, and then dried at 105° C. for 10 minutes. The slip resistance and flexural rigidity were measured by the test methods of Example 6, and these results are reported in Table 3.

COMPARISON EXAMPLE 10

A 40 cm ×40 cm taffeta sample (Tetoron finished yarn woven fabric, thinner than the woven fabric used in Example 6, dyed only, no resin finish) was immersed for 30 seconds in a treatment bath prepared as in Comparison Example 4, removed, expressed with a mangle roll to 100%, and then dried at 105° C. for 10 minutes. The slip resistance and flexural rigidity were measured by the test methods of Example 6, and these results are reported in Table 3.

EXAMPLE 9

Into separate 150 mL sample bottles were placed 7 samples: 100 mL of each of the six emulsion treatment baths (0.5% organopolysiloxane concentration) prepared in Examples 6 through 8 and Comparison Examples 2 through 4, and 100 mL of a 0.5% aqueous solution of colloidal silica (from Nissan Kagaku Kogyo Kabushiki Kaisha, brandname, "Snowtex 20", pH 9.8, 20% silicic anhydride solution), which is a colloidal solution of ultramicroparticulate silicic anhydride.

Each treatment bath was adjusted to pH 5.5 by the addition of acetic acid, and each treatment bath received 5 drops (approximately 1.0 g) of 10% aqueous zinc nitrate solution (catalyst for resin textile finishes). These were then sealed and maintained for 3 days in a thermostatted bath at 70° C. in order to investigate the storage stabilities of these fiber-treatment baths. These results are reported in Table 4.

TABLE 4

| Treatment Baths | Stability of the Treatment Bath after 70° C. for 3 Days |
|---|---|
| Treatment Bath of Example 6 | Almost transparent. No change in liquid. |
| Treatment Bath of Example 7 | Liquid is initially slightly brown. No change occurs. |
| Treatment Bath of Example 8 | Almost transparent. No change in liquid. |
| Treatment Bath of Comparison Example 2 | Initially slightly white. Oil floats to top after 3 days, forming oil drops. |
| Treatment Bath of Comparison Example 3 | Initially slightly white. Oil floats to top after 3 days, forming oil drops. |
| Treatment Bath of Comparison Example 4 | Initially almost transparent. Opaque after 3 days. White precipitate observed. |
| Treatment Bath of Colloidal Silica | Initially almost transparent. Gel-like precipitate after 3 days. |

That which is claimed is:

1. A process for the production of a microemulsion composition comprising an organopolysiloxane having an average particle size not exceeding 0.15 micrometers and composed of 10 to 95 mol% trifunctional siloxane units with the formula $RSiO_{3/2}$ wherein R is a monovalent organic group selected from the group consisting of alkyl, alkenyl, phenyl, tolyl, 2-phenylethyl, 2-phenylpropyl, 3,3,3-trifluoropropyl, gamma-aminopropyl, gamma-(N-ethylamino)propyl, gamma-(N-butylamino)propyl, 4-(N-cyclohexylamino)butyl, 4-(N-phenylamino)butyl, N-aminoethylaminopropyl, beta-(N,N-dimethylamino)ethyl, gamma-glycidoxypropyl, 3,4-epoxycyclohexylpropyl, gamma-mercaptopropyl, and gamma-methacryloxypropyl groups; and 90 to 5 mol% difunctional siloxane units with the formula $R^1_2SiO$ wherein $R^1$ is a monovalent hydrocarbon or halogenated hydrocarbon group, said process comprising the steps of:
   (1) preparing a crude emulsion by mixing to homogeniety (A) 10 to 95 mols of organotrialkoxysilane having the formula $RSi(OR^1)_3$ wherein R is a monovalent organic group noted above and $R^1$ is a monovalent hydrocarbon or halogenated hydrocarbon group, (B) 90 to 5 mole of as $R^1_2SiO$ units of cyclic organopolysiloxane having the formula $(R^1_2SiO)_n$ wherein $R^1$ is a monovalent hydrocarbon or halogenated hydrocarbon group and n is an integer having a value of 3 to 10, (C) surfactant, and (D) water and passing this mixture through an emulsifying device;
   (2) dripping said crude emulsion into an aqueous emulsion-polymerization catalyst solution containing an anionic or cationic catalyst; and
   (3) maintaining the resulting mixture of aqueous emulsion-polymerization catalyst solution and crude emulsion at 0° to 90° C. until said microemulsion has been achieved.

2. A process according to claim 1 wherein $R^1$ is the methyl group.

3. A process according to claim 1 wherein R is the methyl group.

4. A process according to claim 1 wherein $R^1$ and R are methyl groups.

5. A process according to claim 1 wherein the crude emulsion is composed of (A) 30 to 95 mol% of the organotrialkoxysilane having the formula $RSi(OR^1)_3$ and (B) 70 to 5 mol% as $R^1_2SiO$ units at the cyclic organopolysiloxane having the formula $(R^1_2SiO)_n$.

6. A process according to claim 1 wherein Component (C) is a non-ionic surfactant.

7. A process according to claim 6 wherein $R^1$ is the methyl group.

8. A process according to claim 6 wherein R is the methyl group.

9. A process according to claim 6 wherein $R^1$ and R are methyl groups.

* * * * *